(12) United States Patent
Ishida

(10) Patent No.: US 11,306,018 B2
(45) Date of Patent: Apr. 19, 2022

(54) OPTICAL FIBER MANUFACTURING METHOD

(71) Applicant: FUJIKURA LTD., Tokyo (JP)

(72) Inventor: Itaru Ishida, Suzuka (JP)

(73) Assignee: FUJIKURA LTD., Tokyo (JP)

( * ) Notice: Subject to any disclaimer, the term of this patent is extended or adjusted under 35 U.S.C. 154(b) by 254 days.

(21) Appl. No.: 16/489,465

(22) PCT Filed: Feb. 6, 2018

(86) PCT No.: PCT/JP2018/004008
§ 371 (c)(1),
(2) Date: Aug. 28, 2019

(87) PCT Pub. No.: WO2018/189987
PCT Pub. Date: Oct. 18, 2018

(65) Prior Publication Data
US 2020/0048138 A1 Feb. 13, 2020

(30) Foreign Application Priority Data

Apr. 10, 2017 (JP) .............................. JP2017-077689

(51) Int. Cl.
*C03B 37/025* (2006.01)
*C03C 25/106* (2018.01)
*C03C 25/12* (2006.01)

(52) U.S. Cl.
CPC ........ *C03B 37/0253* (2013.01); *C03C 25/106* (2013.01); *C03C 25/12* (2013.01)

(58) Field of Classification Search
None
See application file for complete search history.

(56) References Cited

U.S. PATENT DOCUMENTS

| 6,279,354 B1 * | 8/2001 | Paek ................. C03B 37/02718 65/510 |
| 7,937,971 B2 | 5/2011 | Costello, III et al. |
| 2003/0101774 A1 * | 6/2003 | Oh .................... C03B 37/02718 65/488 |

(Continued)

FOREIGN PATENT DOCUMENTS

| CN | 1437035 A | 8/2003 |
| CN | 104995142 A | 10/2015 |

(Continued)

OTHER PUBLICATIONS

International Search Report issued in corresponding International Application No. PCT/JP2018/004008, dated May 1, 2018 (5 pages).

*Primary Examiner* — Cynthia Szewczyk
(74) *Attorney, Agent, or Firm* — Osha Bergman Watanabe & Burton LLP

(57) ABSTRACT

An optical fiber manufacturing method includes: drawing an optical fiber preform to form a bare optical fiber; cooling the bare optical fiber by a non-contact direction changer; adjusting a temperature of the bare optical fiber in a temperature adjusting unit disposed downstream of the non-contact direction changer and upstream of a coating unit; disposing, in the coating unit, an uncured coating layer that comprises a resin precursor on an outer periphery of the bare optical fiber; and curing the uncured coating layer in a curing unit.

10 Claims, 7 Drawing Sheets

(56) References Cited

U.S. PATENT DOCUMENTS

| | | | |
|---|---|---|---|
| 2009/0158779 A1* | 6/2009 | Faler | C03B 37/032 65/441 |
| 2010/0281922 A1* | 11/2010 | Costello, III | C03B 37/032 65/430 |
| 2014/0096565 A1 | 4/2014 | Gregorski et al. | |
| 2016/0229734 A1 | 8/2016 | Okada | |
| 2017/0073265 A1 | 3/2017 | Bookbinder et al. | |

FOREIGN PATENT DOCUMENTS

| | | |
|---|---|---|
| CN | 105859120 A | 8/2016 |
| EP | 0887319 A1 | 12/1998 |
| JP | H10007431 A | 1/1998 |
| JP | 2001013380 A | 1/2001 |
| JP | 2011523397 A | 8/2011 |
| JP | 5851636 B1 | 2/2016 |
| JP | 2016147771 A | 8/2016 |
| WO | 2017022290 A1 | 2/2017 |

* cited by examiner

OPTICAL FIBER MANUFACTURING METHOD

CROSS-REFERENCE TO RELATED APPLICATIONS

This is a U.S. National Stage application of International Application No. PCT/JP2018/004008 filed Feb. 6, 2018, which claims priority to Japanese Patent Application No. 2017-077689 filed Apr. 10, 2017. These references are incorporated herein by reference in their entirety.

TECHNICAL FIELD

The present invention relates to an optical fiber manufacturing method.

BACKGROUND

In the related art, an optical fiber manufacturing method including a drawing step, a coating step, and a curing step has been known. In the drawing step, an optical fiber preform is drawn to form a bare optical fiber. In the coating step, a coating layer which is uncured (hereinafter, simply referred to as an uncured coating layer) made of resin is provided on the outer periphery of the bare optical fiber. In the curing step, the uncured coating layer is cured.

In such a manufacturing method, in order to increase the production capacity of an optical fiber, it is necessary to increase a drawing speed. However, if the drawing speed is increased, the time for the optical fiber to pass through each cooling device or each coating curing device becomes short, so it is necessary to increase the number of these devices.

Further, if a high temperature bare optical fiber drawn from a melting furnace is slowly cooled by a slow-cooling furnace, a transmission loss, which is one of the important characteristics of an optical fiber, can be reduced. Therefore, in order to increase the drawing speed while limiting the increase in transmission loss, it is necessary to increase the number of slow-cooling furnaces.

Here, a bare optical fiber without the coating layer which is easily damaged passes through the slow-cooling furnace. In addition, an optical fiber having a liquid uncured coating layer is passed through the coating curing device. If the optical fiber in these states is brought into contact with a pulley or the like for changing the direction, it may cause the reduction of the strength of the optical fiber, or the deformation of the coating layer. Therefore, each device needs to be disposed downwardly along a linear pathway from the melting furnace of the optical fiber preform.

As described above, in order to raise the production capacity of an optical fiber, it is necessary to increase the number of devices disposed downwardly along a linear pathway from a melting furnace. However, in the existing factory building where the space in the height direction is limited, it is difficult to increase the number of devices in this manner, which results in the limitation of drawing speed.

As a technology for overcoming this limitation, Patent Document 1 discloses a non-contact direction changer. The non-contact direction changer can change the traveling direction of the optical fiber without bringing its components into contact with the optical fiber. By using the non-contact direction changer, it is possible to change the traveling direction of the optical fiber even before the uncured coating layer is formed or the uncured coating layer is completely cured. Thus, each device can be disposed freely, and the drawing speed can be increased even in a place where there is a space limitation in the height direction.

PATENT LITERATURE

[Patent Document 1] Japanese Patent No. 5851636

However, when the traveling direction of an optical fiber is changed using a non-contact direction changer, the flow rate of a gas to be sprayed is appropriately changed such that a bare optical fiber is in a predetermined position. When the flow rate of gas is changed in this manner, the temperature of the bare optical fiber after passing through the non-contact direction changer varies. Further, the amount of the resin applied to the outer periphery of the bare optical fiber in the coating step increases or decreases according to the temperature of the bare optical fiber, so the variation in temperature of the bare optical fiber causes variation in the thickness of the coating layer. Further, in a case where the temperature of the bare optical fiber entering the coating unit is not within the appropriate range, the resin material to be the coating layer is not coated properly, or the adhesion strength between the coating layer and the bare optical fiber after curing decreases.

SUMMARY

One or more embodiments of the present invention provide an optical fiber manufacturing method capable of forming a coating layer in a desired state while using a non-contact direction changer.

An optical fiber manufacturing method according to one or more embodiments of the present invention includes a drawing step of drawing an optical fiber preform to form a bare optical fiber; a cooling step of cooling the bare optical fiber by at least one non-contact direction changer; a temperature adjustment step of adjusting a temperature of the bare optical fiber, in a temperature adjusting unit disposed downstream of the non-contact direction changer and upstream of a coating unit; a coating step of providing an uncured coating layer containing a resin precursor on an outer periphery of the bare optical fiber, in the coating unit; and a curing step of curing the uncured coating layer in a curing unit.

One or more embodiments of the present invention provide an optical fiber manufacturing method capable of forming a coating layer in a desired state while using a non-contact direction changer.

DETAILED DESCRIPTION

The configuration of an optical fiber manufacturing apparatus according to one or more embodiments will be described below with reference to FIG. 1. In each drawing used in the following description, the scale is appropriately changed in order to make each unit recognizable.

Figure 1:
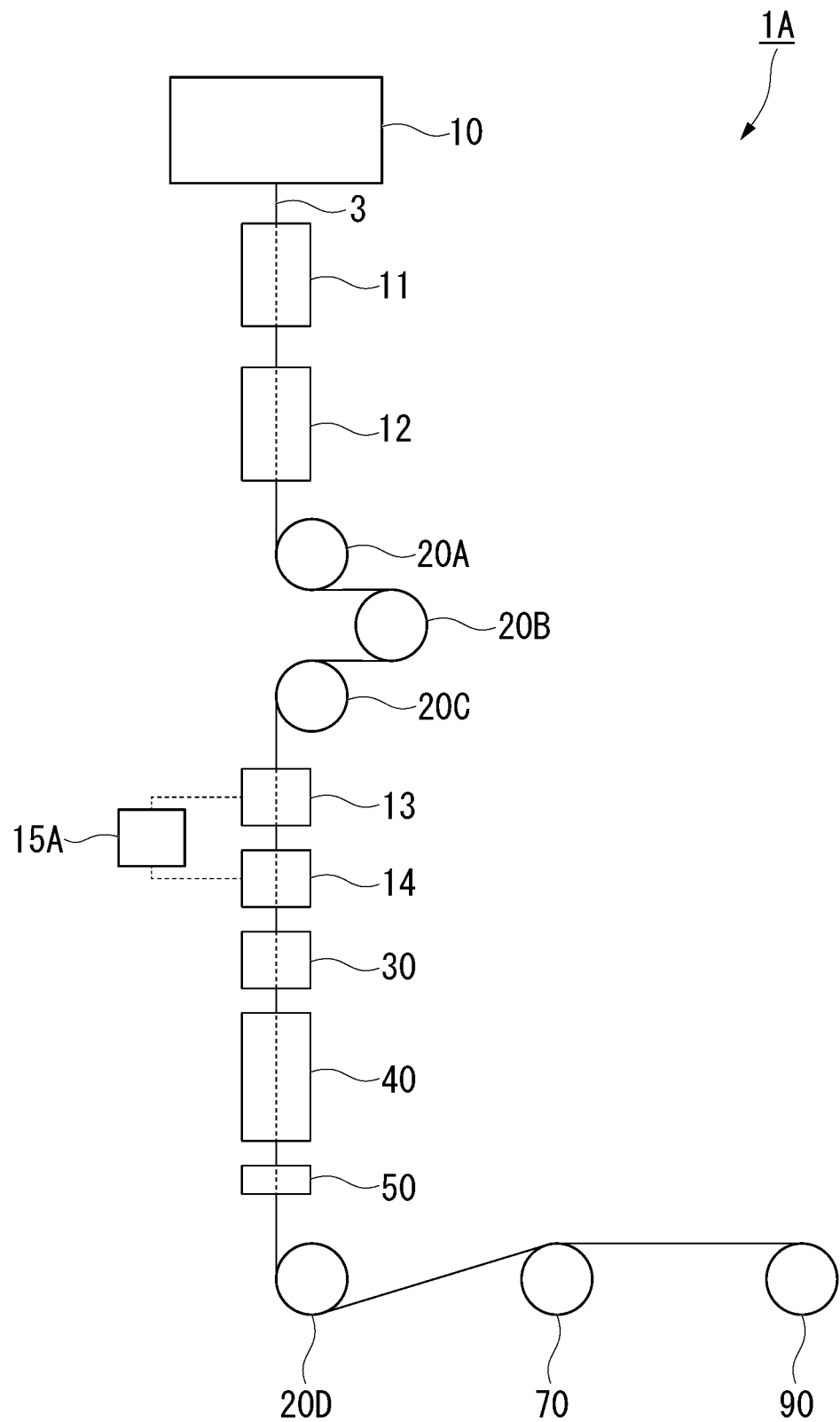
FIG. 1 is a schematic view showing a configuration of an optical fiber manufacturing apparatus according to one or more embodiments.

As shown in FIG. 1, an optical fiber manufacturing apparatus 1A includes a drawing unit 10, a slow-cooling furnace 11, a cooler 12, non-contact direction changers 20A to 20C, a coating unit 30, a curing unit 40, a coating diameter measurement unit 50, a direction changer 20D, a take-up unit 70, and a winding unit 90, and the respective units are disposed in this order from the top.

The drawing unit 10 includes a melting furnace or the like for melting an optical fiber preform. The drawing unit 10 forms a bare optical fiber 3.

The slow-cooling furnace 11 is a device for gradually cooling the high temperature bare optical fiber 3 drawn from the melting furnace of the drawing unit 10. By slowly cooling the bare optical fiber 3 by the slow-cooling furnace 11, the transmission loss of the optical fiber can be reduced.

The cooler 12 cools the bare optical fiber 3. As the cooler 12, a cooling cylinder or the like to be described later can be employed. Since the bare optical fiber 3 is sufficiently cooled by the non-contact direction changers 20A to 20C disposed downstream of the cooler 12, the optical fiber manufacturing apparatus 1A may not include the cooler 12.

The non-contact direction changers 20A, 20B, 20C are disposed in this order below the cooler 12. The non-contact direction changers 20A, 20B, 20C change the traveling directions of the bare optical fibers 3 by 90°, 180°, and 90°, respectively. For example, the non-contact direction changer 20A changes the traveling direction of the bare optical fiber 3 by about 90° from the downward direction to the horizontal direction. Note that at least one non-contact direction changer may be installed. In addition, the installation position, the angle of direction change, or the like of the non-contact direction changer may be converted as appropriate.

The non-contact direction changers 20A to 20C each have a guide groove for guiding the bare optical fiber 3. In the guide groove, an outlet of fluid (gas) for floating a bare optical fiber wired along the guide groove is formed. The non-contact direction changers 20A to 20C spray a gas such as air or helium onto the bare optical fiber 3 from the outlet. Thus, it is possible to float the bare optical fiber 3 without bringing the component into contact with the bare optical fiber 3. The configuration of the non-contact direction changer of one or more embodiments is the same as the configuration described in Japanese Patent No. 5851636, and thus a detailed description is omitted here.

In a case where air is used as the gas sprayed onto the bare optical fiber 3, the gas flow rate required to float the bare optical fiber 3 is, for example, about 100 to 200 L/min. The gas flow rate is appropriately changed depending on the width of the gas outlet and the like. By adjusting the gas flow rate, it is possible to adjust the floating amount of the bare optical fiber 3, that is, the passing position of the bare optical fiber 3 with respect to each component.

When the passing position of the bare optical fiber 3 changes significantly, the bare optical fiber 3 comes in contact with each component, which causes the strength of the optical fiber to be reduced. In addition, an ultraviolet-curable resin may be used as the coating layer, and a UV-LED may be used as a curing device of the curing unit 40. Since the irradiation light of the UV-LED has directivity, the area in which the ultraviolet ray can be irradiated is relatively small. Therefore, in order to irradiate ultraviolet ray to the uncured coating layer reliably, it is necessary to control the passing position of the optical fiber more strictly. Therefore, a position sensor (not shown) is disposed below the non-contact direction converters 20A to 20C, and the position sensor measures the position of the optical fiber. The flow rate of the gas to be sprayed onto the optical fiber is adjusted by the non-contact direction changers 20A to 20C such that the position of the optical fiber is an appropriate position, based on the measurement result.

The bare optical fiber 3 having passed through the non-contact direction changer 20A to 20C enters the coating unit 30 after passing through the temperature adjusting unit 13 and the temperature measurement unit 14 (e.g., temperature sensor) described later.

The coating unit 30 applies (or coats) a fluid material (hereinafter, simply referred to as a resin material) containing a resin precursor to the outer periphery of the bare optical fiber 3 by die coating or the like to form an uncured coating layer. The coating of the resin material is, for example, a two-layer coating, and a resin material for a primary coating layer with a low Young's modulus is applied to the inside, and a resin material for a secondary coating layer with a high Young's modulus is applied to the outside. For example, an ultraviolet-curable resin such as a urethane acrylate resin can be used as the coating layer. In addition, the coating unit 30 may be configured to coat a primary coating layer and a secondary coating layer separately, or to coat a primary coating layer and a secondary coating layer simultaneously. In one or more embodiments, an element which is in a state where the coating layer is provided on the outer periphery of the bare optical fiber 3 is referred to as an optical fiber.

In order to realize a stable coating, the viscosity of the resin material applied to the bare optical fiber 3 by the coating unit 30 needs to be low to some extent. The viscosity of the resin material can be reduced by raising the temperature of the resin material. Therefore, the temperature of the resin material applied by the coating unit 30 may be previously raised above room temperature. In particular, as the viscosity of the resin material at room temperature is higher, it is necessary to raise the temperature of the resin material when applied by the coating unit 30.

The optical fiber having passed through the coating unit 30 enters a curing unit 40 which cures the uncured coating layer. In the case where the coating layer is made of an ultraviolet-curable resin, an ultraviolet irradiation lamp, a UV-LED, and a curing device in which these are combined may be used as the curing unit 40. The number of curing devices disposed as the curing unit 40 may be determined, with the curing degree of the coating layer having passed through these curing devices as an index.

With respect to the optical fiber having passed through the curing unit 40, the outer diameter of the coating layer is measured by the coating diameter measurement unit 50, and then the traveling direction is changed from the downward direction to a substantially horizontal direction by the direction changer 20D. The optical fiber is taken up by a take-up unit 70 and wound up by the winding unit 90. In addition, since the coating layer of the optical fiber having passed through the curing unit 40 has already been cured, a direction changer, such as a contact-type pulley, can be used as the direction changer 20D.

The take-up unit 70 includes, for example, a take-up capstan, and the drawing speed is determined by the take-up unit 70. The drawing speed is, for example, 25 msec or more.

The winding unit 90 includes a winding bobbin or the like for winding up an optical fiber.

Meanwhile, as described above, in the optical fiber manufacturing apparatus 1A according to one or more embodiments, the non-contact direction changers 20A to 20C are disposed upstream of the coating unit 30. The non-contact direction changers 20A to 20C each have a high ability to cool the bare optical fiber 3 in order to blow the gas to the bare optical fiber 3. However, due to variations in gas flow rate and drawing speed, the temperature of the bare optical fiber 3 after passing through the non-contact direction changers 20A to 20C varies. For example, if the gas flow rate increases or the drawing speed decreases, the temperature of the bare optical fiber 3 decreases. If the gas flow rate decreases or the drawing rate increases, the temperature of the bare optical fiber 3 increases. As described above, if the temperature of the bare optical fiber 3 varies, the amount of the resin material to be applied varies when the coating unit 30 applies the resin material to the outer periphery of the bare optical fiber 3.

For example, if the temperature of the bare optical fiber 3 is too high, the wettability of the surface is reduced, the contact angle between the bare optical fiber 3 and the resin material is increased, and the amount of resin material to be applied to the bare optical fiber 3 is reduced. In a case where the resin material is a general ultraviolet-curable resin, if the temperature of the bare optical fiber 3 is too high, the temperature of the resin material when the resin material is cured is increased, and curing failure may also occur.

On the other hand, when the temperature of the bare optical fiber 3 is too low, the contact angle between the bare optical fiber 3 and the resin material decreases too much, and the resin material slips on the surface of the bare optical fiber 3. Thus, the thickness of the coating layer may be unstable, or the adhesion strength between the coating layer after curing and the bare optical fiber 3 may be reduced.

From the above, it is desirable that the temperature of the bare optical fiber 3 after passing through the non-contact direction changers 20A to 20C may be controlled to be stabilized within a predetermined range before entering the coating unit 30. The temperature range is desirably, for example, 30° C. to 100° C.

Therefore, the optical fiber manufacturing apparatus 1A according to one or more embodiments includes a temperature adjusting unit 13 that is configured to adjust the temperature of the bare optical fiber 3, a temperature measurement unit 14 that measures the temperature of the bare optical fiber 3, and a control unit 15A that controls the temperature adjusting unit 13. The temperature adjusting unit 13 and the temperature measurement unit 14 are disposed between the non-contact direction changers 20A to 20C and the coating unit 30.

As the temperature control unit 13, a cooling cylinder that cools the bare optical fiber 3, a heater that heats the bare optical fiber 3, or a temperature adjusting apparatus in which the cooling cylinder and the heater are combined can be used. The cooling cylinder introduces gas into the cavity of the water-cooled cylinder, and allows the bare optical fiber 3 to pass through the cavity so as to cool the bare optical fiber 3. The gas introduced into the cavity includes helium, nitrogen, carbon dioxide, or a mixed gas thereof. For example, in a case where a mixed gas of helium and nitrogen is introduced into the cavity, the thermal conductivities of helium and nitrogen are different from each other, so it is possible to adjust the temperature of the bare optical fiber 3 passing the cooling cylinder by changing the mixing ratio of these gases. Here, the control for changing the gas mixture ratio can be performed in a much shorter time than, for example, the control for changing the temperature of the cooling cylinder, and the response is quick. That is, in the method of adjusting the temperature of the bare optical fiber 3 by changing the gas mixture ratio, the temperature measurement result by the temperature measurement unit 14 can be quickly reflected on the control of the temperature adjusting unit 13.

In addition, as the temperature adjusting unit 13, as long as it is a temperature adjusting apparatus which has a cooling function or a heating function, apparatuses other than a cooling cylinder or a heater may be used. What type of device is used as the temperature adjusting unit 13 may be determined in consideration of the number of non-contact direction changers disposed upstream of the coating unit 30, the flow rates of these gases, the presence or absence of the slow-cooling furnace 11 or the cooler 12, or the like. For example, if the temperature of the bare optical fiber 3 tends to be higher than a desired temperature, a cooling device such as a cooling cylinder is used as the temperature adjusting unit 13, and if the opposite tendency is present, a heating device such as a heater may be used as the temperature adjusting unit 13.

The temperature measurement unit 14 is disposed downstream of the non-contact direction changers 20A to 20C and upstream of the coating unit 30. In one or more embodiments, the temperature measurement unit 14 is located downstream of the temperature adjusting unit 13 and measures the temperature of the bare optical fiber 3 after passing through the temperature adjusting unit 13. As the temperature measurement unit 14, a non-contact temperature measurement device using an infrared sensor, or the like can be used. The temperature measurement unit 14 is connected to the control unit 15A by wired communication or wireless communication, and inputs the measurement result of the temperature of the bare optical fiber 3 to the control unit 15A.

The control unit 15A is a PC or the like, and controls the temperature adjusting unit 13, based on the measurement result of the temperature of the bare optical fiber 3 which is measured by the temperature measurement unit 14. The control unit 15A may control the temperature adjusting unit 13 by PID control. The control unit 15A includes a memory (such as a ROM) (not shown), and the target temperature t of the bare optical fiber 3 is stored in the memory. The target temperature t is a temperature at which the resin material to be the coating layer is appropriately applied to the bare optical fiber 3, and is set in advance.

Figure 2:
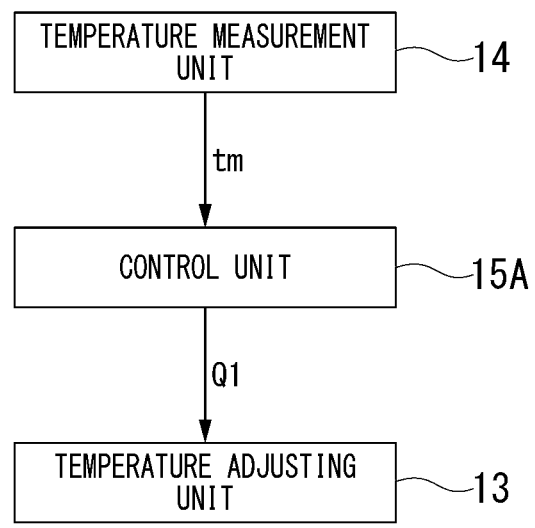
FIG. 2 is a diagram showing a control flow of the optical fiber manufacturing apparatus according to one or more embodiments.

FIG. 2 is a diagram showing an example of control flow by the control unit 15A. As shown in FIG. 2, the temperature measurement unit 14 measures the actual temperature tm of the bare optical fiber 3 after passing through the temperature adjusting unit 13, and inputs the actual temperature tm to the control unit 15A. The control unit 15A compares the actual temperature tm with the target temperature t, and outputs a control signal Q1 according to the magnitude relationship between them to the temperature adjusting unit 13.

For example, when tm>t, a signal for operating the temperature adjusting unit 13 to further lower the temperature of the bare optical fiber 3 is output as the control signal Q1. In a case where the temperature adjusting unit 13 is a cooling cylinder, the temperature adjusting unit 13 that receives the control signal Q1 changes the gas mixture ratio such that the thermal conductivity of the gas introduced into the cavity of the cooling cylinder increases.

Conversely, when tm<t, a signal for operating the temperature adjusting unit 13 to further raise the temperature of the bare optical fiber 3 is output as the control signal Q1. In a case where the temperature adjusting unit 13 is a cooling cylinder, the temperature adjusting unit 13 that receives the control signal Q1 changes the gas mixture ratio such that the thermal conductivity of the gas introduced into the cavity of the cooling cylinder decreases.

Further, in a case where the temperature adjusting unit 13 is a heater or the like, the current value or the like for energizing the heater is changed according to the control signal Q1.

Thus, based on the measurement result of the temperature of the bare optical fiber 3 which is measured by the temperature measurement unit 14, the temperature adjusting unit 13 is configured to adjust the temperature of the bare optical fiber 3 entering the coating unit 30 such that the actual temperature tm approaches the target temperature t.

Next, an optical fiber manufacturing method using the optical fiber manufacturing apparatus 1A configured as described above will be described.

First, in the drawing unit 10, the optical fiber preform is drawn to form a bare optical fiber 3 (drawing step).

After the drawing step, the bare optical fiber 3 is gradually cooled in the slow-cooling furnace 11 in order to reduce the transmission loss of the optical fiber, and then the bare optical fiber 3 is cooled to a predetermined temperature by the cooler 12 (first cooling step).

After the first cooling step, the bare optical fiber 3 is cooled while changing the traveling direction of the bare optical fiber 3 by the non-contact direction changers 20A to 20C (second cooling step). Thus, the cooling step according to one or more embodiments includes the first cooling step and the second cooling step. The temperature of the bare optical fiber 3 having passed through the non-contact direction changers 20A to 20C varies as described above.

After the second cooling step, the temperature of the bare optical fiber 3 is adjusted in a temperature adjusting unit 13 disposed downstream of the non-contact direction changers 20A to 20C and upstream of the coating unit 30 (temperature adjustment step). At this time, the control unit 15A controls the temperature adjusting unit 13 such that the actual temperature tm of the bare optical fiber 3 measured by the temperature measurement unit 14 approaches the target temperature t.

After the temperature adjustment step, in the coating unit 30, an uncured coating layer containing a resin precursor is provided on the outer periphery of the bare optical fiber 3 to form an optical fiber (coating step).

After the coating step, the uncured coating layer is cured by the curing unit 40 (curing step).

After the curing step, in the coating diameter measurement unit 50, the outer diameter of the optical fiber is measured.

Then, the traveling direction of the optical fiber is changed to a substantially horizontal direction by the direction changer 20D, and the optical fiber is wound up by the winding unit 90 while the optical fiber is pulled up by a take-up unit 70.

Next, one or more embodiments of the present invention will be described, but the basic configuration is the same as that of the embodiments described above.

Therefore, the same reference numerals are given to similar configurations, the explanation thereof will be omitted, and only differences will be described.

One or more embodiments described below are different from the embodiments described above in that the temperature adjusting unit 13 is controlled based on the measurement result of the coating diameter measurement unit 50.

Figure 3:
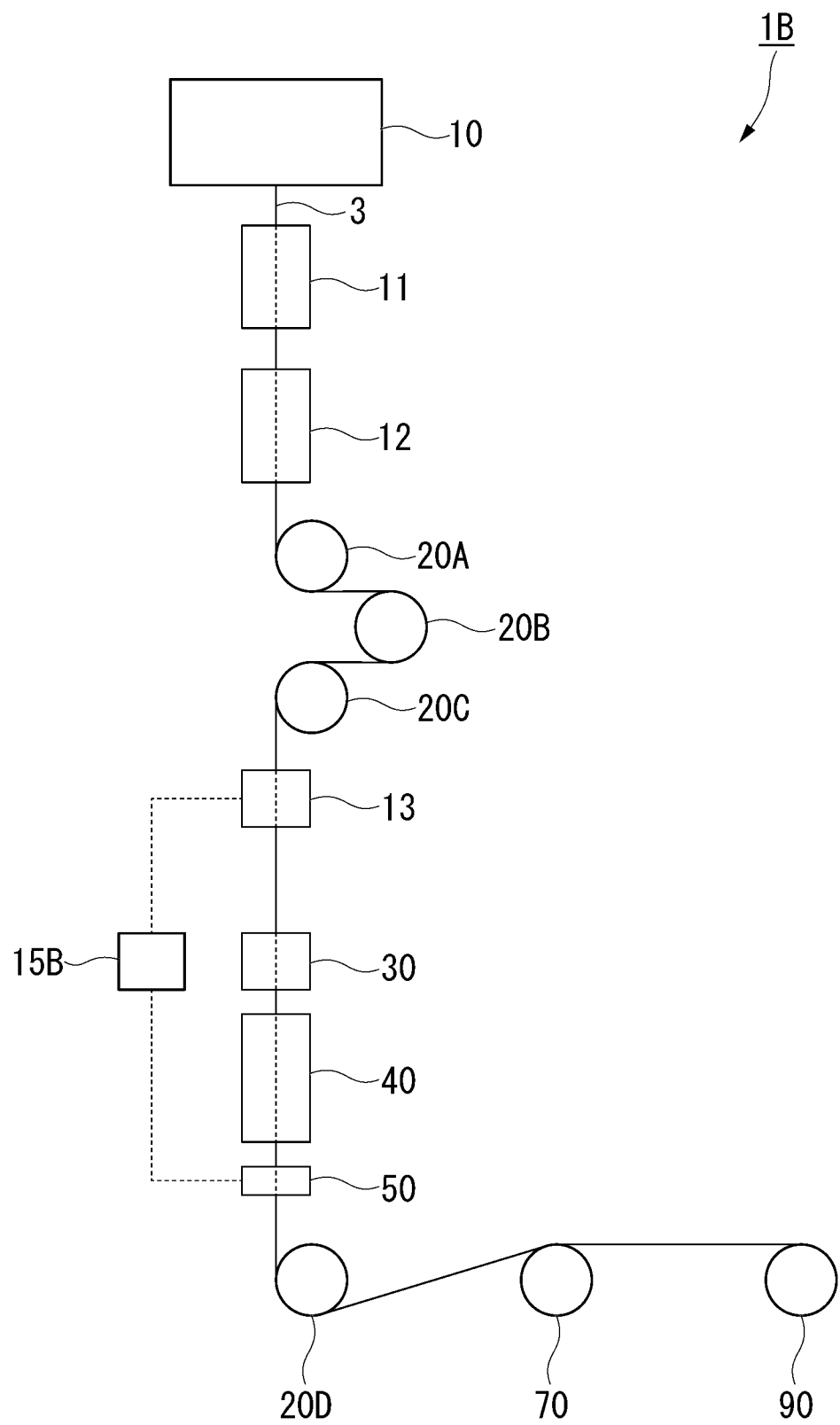
FIG. 3 is a schematic view showing a configuration of an optical fiber manufacturing apparatus according to one or more embodiments.

As shown in FIG. 3, the optical fiber manufacturing apparatus 1B of one or more embodiments includes a control unit 15B connected to the temperature adjusting unit 13 and the coating diameter measurement unit 50 by wired communication or wireless communication. The target coating diameter dc of the optical fiber is stored in the memory of the control unit 15B.

Although the temperature measurement unit is not provided downstream of the temperature adjusting unit 13 in the example of FIG. 3, a temperature measurement unit may be provided as in the embodiments described above.

Figure 4:
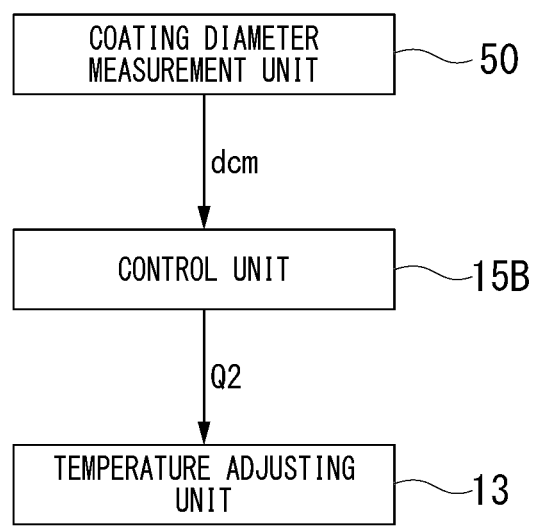
FIG. 4 is a diagram showing a control flow of the optical fiber manufacturing apparatus according to one or more embodiments.

FIG. 4 is a diagram showing an example of control flow by the control unit 15B. As shown in FIG. 4, the coating diameter measurement unit 50 measures the actual coating diameter dcm of the optical fiber after passing through the curing unit 40, and inputs the actual coating diameter dcm to the control unit 15B. The control unit 15B compares the actual coating diameter dcm with the target coating diameter dc, and outputs a control signal Q2 according to the magnitude relationship between them to the temperature adjusting unit 13.

As described above, in a case where the temperature of the bare optical fiber 3 entering the coating unit 30 is high, the amount of resin material to be applied to the bare optical fiber 3 is reduced, and the coating diameter decreases. Conversely, in a case where the temperature of the bare optical fiber 3 entering the coating unit 30 is low, the coating diameter increases.

Therefore, for example, in the case of dcm>dc, a signal for operating the temperature adjusting unit 13 to further raise the temperature of the bare optical fiber 3 is output as the control signal Q2. Conversely, in the case of dcm<dc, a signal for operating the temperature adjusting unit 13 to further lower the temperature of the bare optical fiber 3 is output as the control signal Q2. In response to these control signals Q2, the temperature adjusting unit 13 changes the mixing ratio of the gas introduced into the cooling cylinder, or the like.

Thus, based on the measurement result of the outer diameter of the coating layer formed by curing of the uncured coating layer from the coating diameter measurement unit 50, the temperature adjusting unit 13 adjusts the temperature of the bare optical fiber 3 entering the coating unit 30 such that the actual coating diameter dcm approaches the target coating diameter dc.

Next, one or more embodiments of the present invention will be described, but the basic configuration is the same as that of one or more embodiments described above. Therefore, the same reference numerals are given to similar configurations, the explanation thereof will be omitted, and only difference will be described.

One or more embodiments described below focus on that the drawing speed and the gas flow rate of the non-contact direction changer affect the temperature of the bare optical fiber 3 entering the coating unit 30. One or more embodiments described below are different from the embodiments described above in that the temperature adjusting unit 13 is controlled based on the drawing speed and the gas flow rate.

Figure 5:
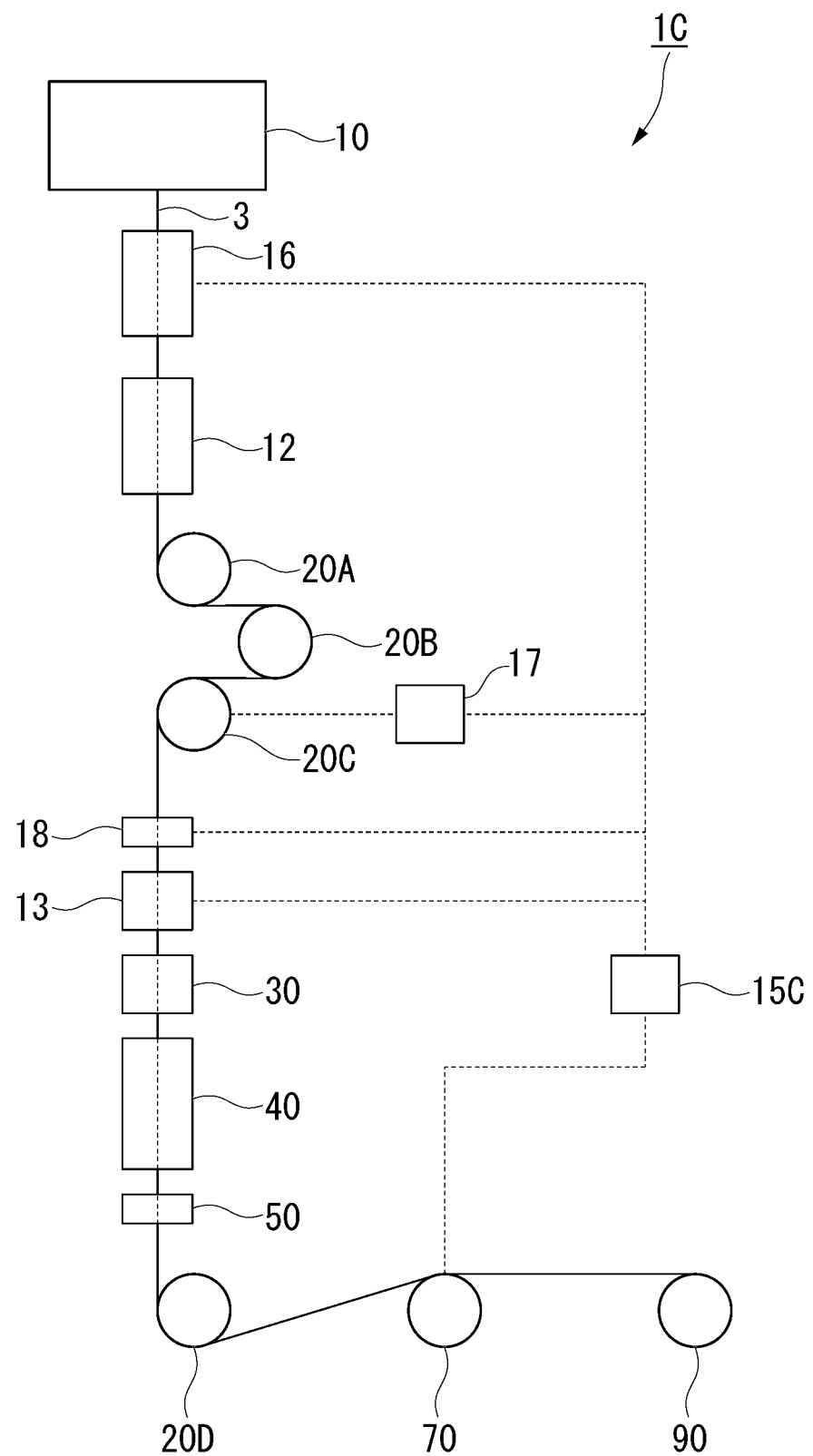
FIG. 5 is a schematic view showing a configuration of an optical fiber manufacturing apparatus according to one or more embodiments.

As shown in FIG. 5, an optical fiber manufacturing apparatus 1C according to one or more embodiments includes a drawing unit 10, a bare fiber diameter measurement unit 16, a cooler 12, non-contact direction changers 20A to 20C, a position detecting unit 18, a temperature adjusting unit 13, a coating unit 30, a curing unit 40, a coating diameter measurement unit 50, a direction changer 20D, a take-up unit 70, and a winding unit 90, and the respective units are disposed in this order from the top.

Further, the optical fiber manufacturing apparatus 1C includes gas flow rate adjustment unit 17 that adjusts the gas flow rate of the non-contact direction changer 20C, and a control unit 15C. A target bare fiber outer diameter df of the bare optical fiber 3 and a target position P of the bare optical fiber 3 having passed through the non-contact direction changer 20C are stored in the memory of the control unit 15C. The target bare fiber outer diameter df and the target position P will be described later. The control unit 15C is connected to the bare fiber diameter measurement unit 16, the gas flow rate adjusting unit 17, the position detecting unit 18, the temperature adjusting unit 13, and the take-up unit 70, by wired communication or wireless communication.

In addition, the take-up unit 70 of one or more embodiments is configured to detect the drawing speed V and input the drawing speed V to the control unit 15C.

Figure 6:
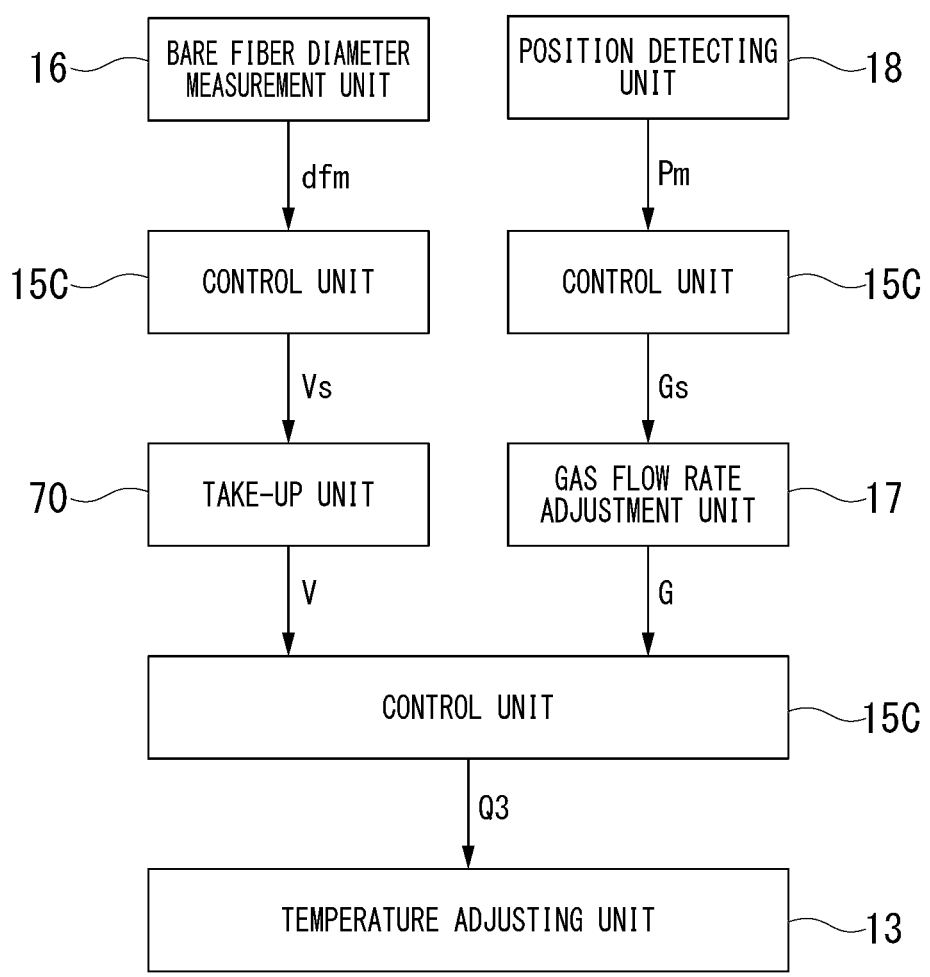
FIG. 6 is a diagram showing a control flow of the optical fiber manufacturing apparatus according to one or more embodiments.

FIG. 6 is a diagram showing an example of control flow by the control unit 15C. As shown in FIG. 6, the bare fiber diameter measurement unit 16 measures the outer diameter (hereinafter referred to as an actual bare fiber outer diameter dfm) of the bare optical fiber 3 drawn from the drawing unit 10, and inputs this to the control unit 15C. The control unit 15C compares the actual bare fiber outer diameter dfm with the target bare fiber outer diameter df of the bare optical fiber 3, and outputs the drawing speed setting value Vs to the take-up unit 70 based on the comparison result. For example, in a case where the actual bare fiber outer diameter dfm is larger than the target bare fiber outer diameter df, the drawing speed setting value Vs is set so as to increase the drawing speed V. Further, in a case where the actual bare fiber outer diameter dfm is smaller than the target bare fiber outer diameter df, the drawing speed setting value Vs is set so as to decrease the drawing speed V. Thus, the control unit 15C adjusts the drawing speed V by the take-up unit 70 such that the actual bare fiber outer diameter dfm approaches the target bare fiber outer diameter df.

On the other hand, the position detecting unit 18 detects the position (hereinafter referred to as the bare fiber position Pm) of the bare optical fiber 3 having passed through the non-contact direction changer 20C and inputs this to the control unit 15C. The control unit 15C compares the bare fiber position Pm with the target position P, and outputs the gas flow rate setting value Gs to the gas flow rate adjustment unit 17 based on the comparison result. For example, in a case where the bare fiber position Pm is closer to the bottom surface of the guide groove of the non-contact direction changer 20C than the target position P, the gas flow rate setting value Gs is set so as to increase the gas flow rate G. Further, in a case where the bare fiber position Pm is farther from the bottom surface than the target position P, the gas flow rate setting value Gs is set so as to decrease the gas flow rate G. Thus, the control unit 15C adjusts the gas flow rate G of the non-contact direction changer 20C such that the bare fiber position Pm approaches the target position P.

Here, the temperature of the bare optical fiber 3 entering the coating unit 30 changes with the drawing speed V and the gas flow rate G. For example, as the drawing speed V increases and the gas flow rate G decreases, the temperature of the bare optical fiber 3 tends to increase. Therefore, the correlation among the drawing speed V, the gas flow rate G, and the temperature of the bare optical fiber 3 is stored in advance in the memory of the control unit 15C. For example, this correlation is obtained by measuring the temperature change of the bare optical fiber 3 when changing the gas flow rate G while keeping the drawing speed V constant, or when changing the drawing speed V while keeping the gas flow rate G constant. As shown in FIG. 6, the control unit 15C refers to the above described correlation, and sets a control signal Q3 such that the temperature of the bare optical fiber 3 approaches a predetermined temperature, based on the drawing speed V and the gas flow rate G. And the control unit 15C outputs the control signal Q3 to the temperature adjusting unit 13.

Hereinafter, the above embodiments will be described using specific examples. The following examples do not limit the present invention.

EXAMPLE

Figure 7:
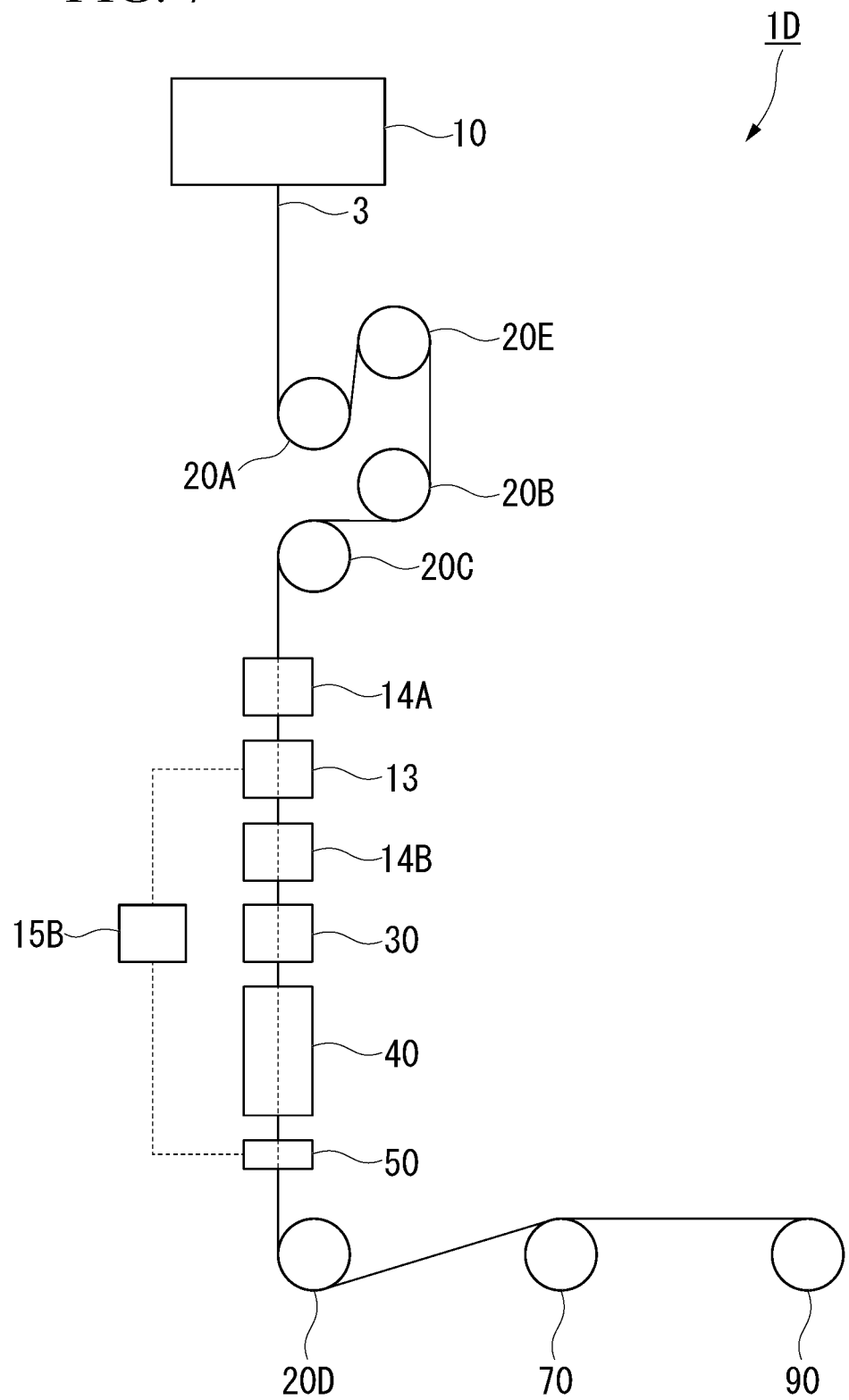
FIG. 7 is a schematic view showing a configuration of an optical fiber manufacturing apparatus according to one or more embodiments.

In the present example, an optical fiber is manufactured using the optical fiber manufacturing apparatus 1D shown in FIG. 7.

The basic configuration of the optical fiber manufacturing apparatus 1D is the same as the configuration of the optical fiber manufacturing apparatus 1B of one or more embodiments described above. Meanwhile, the slow-cooling furnace 11 and the cooler 12 are not provided between the drawing unit 10 and the non-contact direction changer 20A, and a non-contact direction changer 20E is provided between the non-contact direction changers 20A and 20B. The temperature measurement unit 14A is provided between the non-contact direction changer 20C and the temperature adjusting unit 13, and the temperature measurement unit 14B is provided between the temperature adjusting unit 13 and the coating unit 30.

The non-contact direction changers 20A, 20E, 20B, 20C in the optical fiber manufacturing apparatus 1D respectively change the traveling direction of the bare optical fiber 3 in the order of 180°, 180°, 90°, 90°.

In the present example, the above-described cooling cylinder is used as the temperature adjusting unit 13. A mixed gas of helium and nitrogen is used as the gas introduced into the cavity of the cooling cylinder. The target outer diameter (target bare fiber outer diameter df) of the bare optical fiber 3 is 125 µm, and the target outer diameter (target coating diameter dc) of the optical fiber is 250 µm. An ultraviolet-curable resin (urethane acrylate) is employed as the coating layer. The control unit 15B executes the control as shown in FIG. 4 and controls the temperature adjusting unit 13 such that the measurement result of the actual coating diameter dcm which is measured by the coating diameter measurement unit 50 approaches the target coating diameter dc of 250 µm.

More specifically, in the case of dcm>dc, the control unit 15B outputs a control signal Q2 for reducing the mixing ratio of helium in the mixed gas introduced to the temperature adjusting unit 13. Since helium has a larger thermal conductivity than nitrogen, the cooling performance of the cooling cylinder decreases by reducing the mixing ratio of helium, and the temperature of the bare optical fiber 3 entering the coating portion 30 increases. Thus, the amount of resin material applied to the bare optical fiber 3 in the coating unit 30 can be reduced, and the coating diameter can be reduced.

Conversely, in the case of dcm<dc, the control unit 15B outputs a control signal Q2 for increasing the mixing ratio of helium in the mixed gas introduced to the temperature adjusting unit 13, thereby increasing the coating diameter.

In the optical fiber manufacturing apparatus 1D configured as described above, the drawing speed is changed in the range of 28 to 50 msec. As described above, since the temperature of the bare optical fiber 3 entering the coating unit 30 changes with the drawing speed, the outlet diameter of the die installed as the coating unit 30 is appropriately changed.

As a result, the temperature of the bare optical fiber 3 measured by the temperature measurement unit 14A is 103° C. at a drawing speed of 28 msec, 143° C. at 33 msec, 229° C. at 44 msec and 271° C. at 50 msec.

On the other hand, the temperature of the bare optical fiber 3 measured by the temperature measurement unit 14B is 30° C. at a drawing speed of 28 msec, 37° C. at 33 msec, 56° C. at 44 msec and 68° C. at 50 msec.

Thus, while the temperature of the bare optical fiber 3 before passing through the temperature adjusting unit 13 is 103° C. to 271° C., the temperature of the bare optical fiber 3 after passing through the temperature adjusting unit 13 is 30° C. to 68° C.

The outer diameter of the coating layer after the coating layer is cured is stable at 250 µm, and no coating failure or curing failure is observed. From this, it is understood that a temperature in a range of at least 30° C. to 68° C. is appropriate as the temperature of the bare optical fiber 3 entering the coating unit 30.

Further, even when the drawing speed is changed in the range of ±1 msec, it is confirmed that the change in the outer diameter of the coating layer is within ±1 µm, and the stability of the coating is good.

Comparative Example 1

As Comparative Example 1, an optical fiber is manufactured using the same optical fiber manufacturing apparatus 1D as in the example, without controlling the temperature adjusting unit 13 by the control unit 15B. As a result, when the drawing speed is changed in the range of ±1 msec, the outer diameter of the coating layer is changed by about ±5 µm.

From the comparison between Comparative Example 1 and the example, it can be understood that the temperature adjusting unit 13 is appropriately controlled by the control unit 15B in the example, and the effect of stabilizing the outer diameter of the coating layer is obtained.

Comparative Example 2

As Comparative Example 2, the optical fiber is manufactured by the apparatus except the temperature adjusting unit 13 from the configuration of the optical fiber manufacturing apparatus 1D in the example. That is, it is configured such that the bare optical fiber 3 having passed through the non-contact direction changer 20C enters the coating unit 30 without passing through the temperature adjustment step. In this configuration, when the drawing speed is 32 msec, the temperature of the bare optical fiber 3 entering the coating unit 30 is 100° C. And when the drawing speed is 35 msec, the temperature of the bare optical fiber 3 entering the coating unit 30 is 116° C.

As a result, when the drawing speed is in a range of less than 32 msec, a coating failure or the like is not found. However, when the drawing speed is 32 msec, the outer diameter of the coating layer varies by about ±5 µm, even though the drawing speed is stable. Further, when the drawing speed is 35 msec, the bare optical fiber 3 is not coated with the resin material to be the coating layer. This is because in a case where the temperature of the bare optical fiber 3 is 100° C., it is close to the upper limit of the temperature at which the resin material is appropriately applied, and in a case where the temperature is 116° C., it exceeds the upper limit.

From the above, it is desirable that the temperature of the bare optical fiber 3 between the temperature adjusting unit 13 and the coating unit 30, that is, the temperature of the bare optical fiber 3 entering the coating unit 30 is controlled to be 100° C. or less.

Comparative Example 3

In Comparative Example 3, the drawing speed is 10 msec, using the optical fiber manufacturing apparatus 1D having the same configuration as that of Comparative Example 1. That is, it is configured such that the bare optical fiber 3 is cooled by the cooling cylinder of the temperature adjusting unit 13 while reducing the drawing speed, and then the bare optical fiber 3 enters the coating unit 30. In this configuration, the temperature of the bare optical fiber 3 entering the coating unit 30 is 20° C.

As a result, although the coating layer is formed on the bare optical fiber 3, the adhesion strength between the coating layer after curing and the bare optical fiber 3 is weak, and the coating layer is peeled off from the bare optical fiber 3 by lightly handling the optical fiber with fingers. This is a phenomenon that occurs because the temperature of the bare optical fiber 3 entering the coating unit 30 is too low.

On the other hand, in Example 1, in a case where the temperature of the bare optical fiber 3 entering the coating unit 30 is 30° C. (drawing speed 28 m/sec), it is confirmed that the coating layer is normally formed. Therefore, it is desirable that the temperature of the bare optical fiber 3 between the temperature adjusting unit 13 and the coating unit 30, that is, the temperature of the bare optical fiber 3 entering the coating unit 30 is controlled to be 30° C. or higher.

As described above, according to the optical fiber manufacturing method using the optical fiber manufacturing apparatuses 1A to 1D, the optical fiber manufacturing method includes a temperature adjustment step of adjusting the temperature of the bare optical fiber 3 in the temperature adjusting unit 13 disposed downstream of the non-contact direction changer 20C and upstream of the coating unit 30. Thereby, even in a case of using the non-contact direction changer, the temperature variation of the bare optical fiber 3 entering the coating unit 30 is limited, so a coating layer in a desired state can be formed on the outer periphery of the bare optical fiber 3.

Further, in the configuration of one or more embodiments, the temperature adjusting unit 13 adjusts the temperature of the bare optical fiber 3, based on the measurement result of the temperature of the bare optical fiber 3 which is measured by the temperature measurement unit 14 disposed downstream of the non-contact direction changer 20C and upstream of the coating unit 30. In this case, the temperature of the bare optical fiber 3 entering the coating unit 30 can be adjusted with higher accuracy.

Further, in the configuration of one or more embodiments, the temperature adjusting unit 13 adjusts the temperature of the bare optical fiber 3, based on the measurement result of the outer diameter of the coating layer which is measured by the coating diameter measurement unit 50 disposed downstream of the curing unit 40. In this case, it is possible to more directly limit the variation of the outer diameter of the coating layer.

Further, in the configuration of one or more embodiments, for controlling the temperature adjusting unit 13 based on the drawing speed V and the gas flow rate G with reference to the correlation, an optimum temperature setting value according to the drawing speed V and the gas flow rate G can be determined.

In the configuration of the example, the temperature of the bare optical fiber 3 between the temperature adjusting unit 13 and the coating unit 30, that is, the temperature of the bare optical fiber 3 entering the coating unit 30 is set within the range of 30° C. or more and 100° C. or less. In this case, it is possible to limit insufficient adhesion between the cured coating layer and the bare optical fiber 3 or inappropriate application of the resin material to be the coating layer on the bare optical fiber 3.

In addition, in order to response various variations or conditions when controlling the temperature adjusting unit 13, a margin of about 10° C. in the above temperature range may be allowed. In this case, the temperature of the bare optical fiber 3 entering the coating unit 30 may be in the range of 40° C. or more and 90° C. or less.

Further, the temperature adjusting unit 13 may have a function of cooling or heating the bare optical fiber 3. If the temperature of the bare optical fiber 3 tends to be higher than a desired temperature, a cooling device is used as the temperature adjusting unit 13, and if the opposite tendency is present, a heating device is used as the temperature adjusting unit 13. Thereby, the temperature of the bare optical fiber 3 can be in the above range.

In addition, in a case of where a temperature adjusting device having cooling and heating functions is used for the temperature adjusting unit 13, it becomes possible to cope with both tendencies, and the temperature of the bare optical fiber 3 can be adjusted with higher accuracy.

It should be noted that the technical scope of the present invention is not limited to the above-described embodiments, and various modifications can be made without departing from the spirit of the present invention.

For example, although the temperature measurement unit 14 in one or more embodiments is disposed between the temperature adjusting unit 13 and the coating unit 30, the temperature measurement unit 14 can be disposed at any position downstream of the non-contact direction changer 20C and upstream of the coating unit 30. For example, the temperature measurement unit 14 may be disposed between the non-contact direction changer 20C and the temperature adjusting unit 13.

In addition, without departing from the spirit of the present invention, it is possible to appropriately replace the constituent elements in the above-described embodiments with well-known constituent elements, and the above-described embodiments and modifications may be appropriately combined.

REFERENCE SIGNS LIST

1A to 1D optical fiber manufacturing apparatus
3 bare optical fiber
10 drawing unit
13 temperature adjusting unit
14 temperature measurement unit
15A to 15C control unit
20A to 20C, 20E non-contact direction changer
30 coating unit
40 curing unit
50 coating diameter measurement unit
70 take-up unit
90 winding unit Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An optical fiber manufacturing method comprising:
   drawing an optical fiber preform to form a bare optical fiber;
   cooling the bare optical fiber by a non-contact direction changer;
   adjusting a temperature of the bare optical fiber without using any non-contact direction changers in a temperature adjusting unit disposed downstream of and below the non-contact direction changer and upstream of a coating unit;
   disposing, in the coating unit, an uncured coating layer that comprises a resin precursor on an outer periphery of the bare optical fiber the temperature of which is adjusted in the temperature adjusting unit; and
   curing the uncured coating layer in a curing unit.

2. The optical fiber manufacturing method according to claim 1, wherein the temperature adjusting unit adjusts the temperature of the bare optical fiber based on a measurement result of a temperature sensor disposed downstream of the non-contact direction changer and upstream of the coating unit.

3. The optical fiber manufacturing method according to claim 1, wherein the temperature adjusting unit adjusts the temperature of the bare optical fiber based on a measurement result of an outer diameter of the coating layer by a coating diameter measurement unit disposed downstream of the curing unit.

4. The optical fiber manufacturing method according to claim 1, wherein the temperature of the bare optical fiber between the temperature adjusting unit and the coating unit is 30° C. or more and 100° C. or less.

5. The optical fiber manufacturing method according to claim 1, wherein the temperature adjusting unit cools the bare optical fiber.

6. The optical fiber manufacturing method according to claim 1, wherein the temperature adjusting unit heats the bare optical fiber.

7. The optical fiber manufacturing method according to claim 1, wherein
   the temperature adjusting unit and the coating unit are disposed with no non-contact direction changer therebetween.

8. The optical fiber manufacturing method according to claim 1, further comprising:
   cooling the bare optical fiber by a slow-cooling furnace disposed between a drawing unit that melts and optical fiber preform and forms the bare optical fiber and the non-contact direction changer.

9. The optical fiber manufacturing method according to claim 8, further comprising:
   cooling the bare optical fiber by a cooler disposed between the slow-cooling furnace and the non-contact direction changer.

10. The optical fiber manufacturing method according to claim 1, wherein the temperature of the bare optical fiber is 103° C. or higher and 271° C. or lower between the non-contact direction changer and the temperature adjusting unit.

\* \* \* \* \*